US012084575B2

(12) United States Patent
Choi et al.

(10) Patent No.: US 12,084,575 B2
(45) Date of Patent: Sep. 10, 2024

(54) POLYAMIDE-IMIDE FILM, PREPARATION METHOD THEREOF, COVER WINDOW AND DISPLAY DEVICE COMPRISING THE SAME

(71) Applicant: SK microworks Co., Ltd., Gyeonggi-do (KR)

(72) Inventors: Sang Hun Choi, Gyeonggi-do (KR); Jin Woo Lee, Gyeonggi-do (KR); Jung Hee Ki, Gyeonggi-do (KR); Dae Seong Oh, Gyeonggi-do (KR); Han Jun Kim, Gyeonggi-do (KR); Sun Hwan Kim, Gyeonggi-do (KR); Heung Sik Kim, Gyeonggi-do (KR)

(73) Assignee: SK MICROWORKS CO., LTD., Gyeonggi-Do (KR)

( * ) Notice: Subject to any disclaimer, the term of this patent is extended or adjusted under 35 U.S.C. 154(b) by 15 days.

(21) Appl. No.: 17/577,919

(22) Filed: Jan. 18, 2022

(65) Prior Publication Data
US 2022/0243061 A1    Aug. 4, 2022

(30) Foreign Application Priority Data

Jan. 29, 2021    (KR) .................. 10-2021-0013651
Jan. 7, 2022    (KR) .................. 10-2022-0002806

(51) Int. Cl.
*C08L 79/08*        (2006.01)
*B32B 27/28*        (2006.01)
(Continued)

(52) U.S. Cl.
CPC ............ *C08L 79/08* (2013.01); *B32B 27/281* (2013.01); *C08G 73/1039* (2013.01);
(Continued)

(58) Field of Classification Search
CPC ............ C08L 79/08; C08L 2203/162; C08L 2203/20; B32B 27/281; B32B 2264/025;
(Continued)

(56) References Cited

U.S. PATENT DOCUMENTS

2020/0407507 A1    12/2020    Oh et al.

FOREIGN PATENT DOCUMENTS

CN    112500567 A  *  3/2021    ......... C08G 73/1007
JP    2020-037853 A      3/2020
(Continued)

OTHER PUBLICATIONS

Extended European Search Report for European Patent Application No. 22153872.1 issued by the European Patent Office on Jun. 30, 2022.
(Continued)

*Primary Examiner* — John D Freeman
(74) *Attorney, Agent, or Firm* — IP & T GROUP LLP

(57) ABSTRACT

The embodiments relate to a polyamide-imide film excellent in optical properties and mechanical properties, to a process for preparing the same, and to a cover window and a display device comprising the same. There are provided a polyamide-imide film, which comprises a polyamide-imide polymer and has a reduced modulus of a top surface measured by the nanoindentation method according to the ISO 14577-2 standard of 5.6 GPa or more and a haze of 1% or less, a process for preparing the same, and a cover window and a display device comprising the same.

9 Claims, 3 Drawing Sheets

(51) Int. Cl.
  *C08G 73/10* (2006.01)
  *C08G 73/14* (2006.01)
  *C08J 5/18* (2006.01)
  *C08K 3/30* (2006.01)
  *C08K 3/36* (2006.01)

(52) U.S. Cl.
  CPC ........... *C08G 73/14* (2013.01); *C08J 5/18* (2013.01); *C08K 3/30* (2013.01); *C08K 3/36* (2013.01); *B32B 2264/025* (2013.01); *B32B 2264/1021* (2020.08); *B32B 2264/104* (2013.01); *B32B 2264/301* (2020.08); *B32B 2264/302* (2020.08); *B32B 2307/412* (2013.01); *B32B 2457/20* (2013.01); *C08K 2003/3045* (2013.01); *C08K 2201/003* (2013.01); *C08K 2201/009* (2013.01); *C08K 2201/011* (2013.01); *C08L 2203/20* (2013.01)

(58) Field of Classification Search
  CPC ...... B32B 2264/1021; B32B 2264/104; B32B 2264/301; B32B 2264/302; B32B 2307/412; B32B 2457/20; C08J 5/18; C08J 2379/08; C08K 3/30; C08K 3/36; C08K 2003/3045; C08K 2201/003; C08K 2201/011; C08K 3/013; C08K 2201/009; C08G 73/1039; C08G 73/14; G09F 9/301
  See application file for complete search history.

(56) References Cited

FOREIGN PATENT DOCUMENTS

| | | | |
|---|---|---|---|
| JP | 2020-184077 A | 11/2020 | |
| KR | 2020092628 A | * 8/2020 | ........... C08G 69/265 |
| WO | 2021/177288 A1 | 9/2021 | |

OTHER PUBLICATIONS

Office Action for the Japanese Patent Application No. 2022-008209 issued by the Japanese Patent Office on Feb. 14, 2023.

* cited by examiner

[Fig. 1]
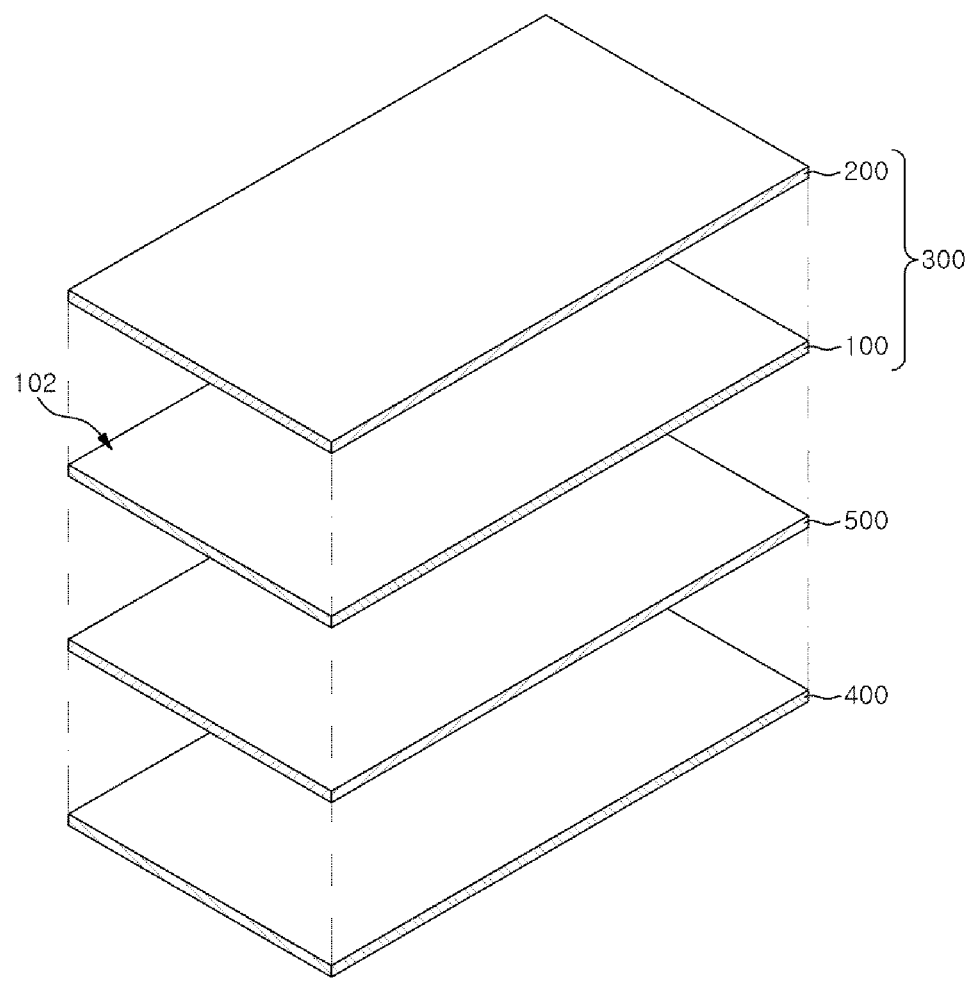

[Fig. 2]
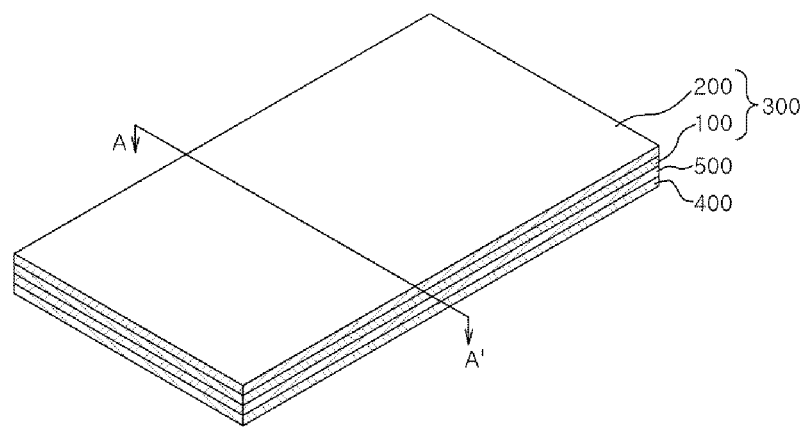
[Fig. 3]
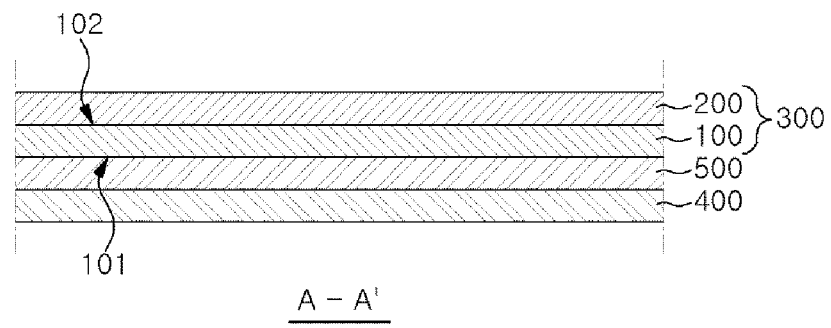
A − A'

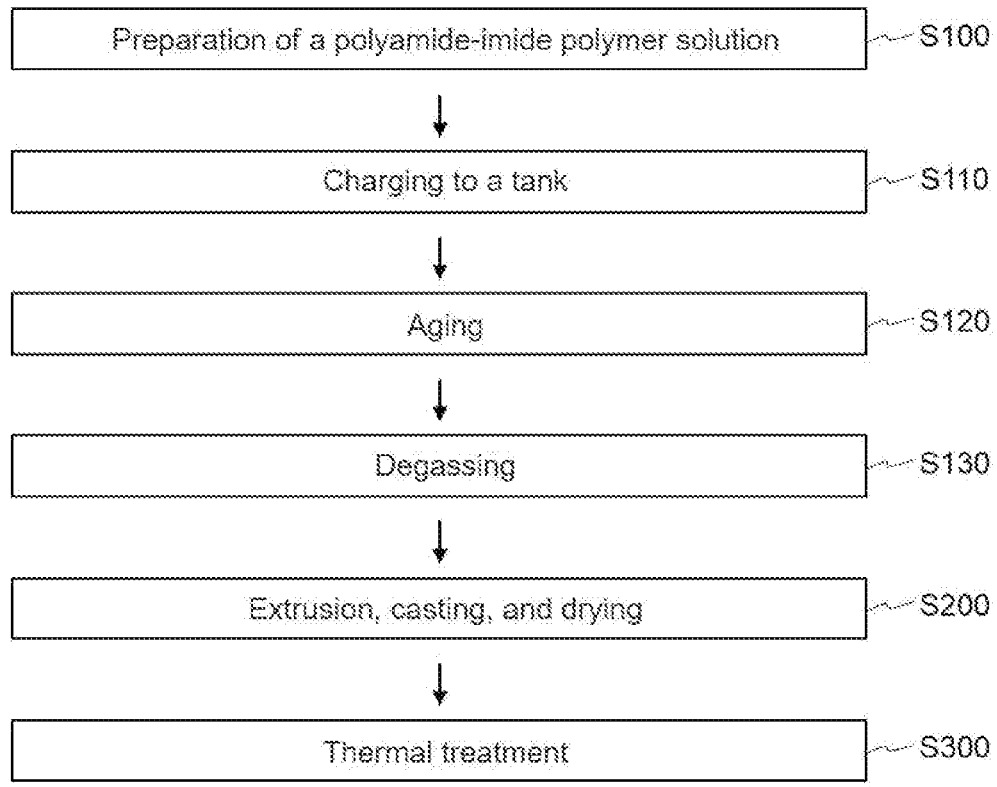
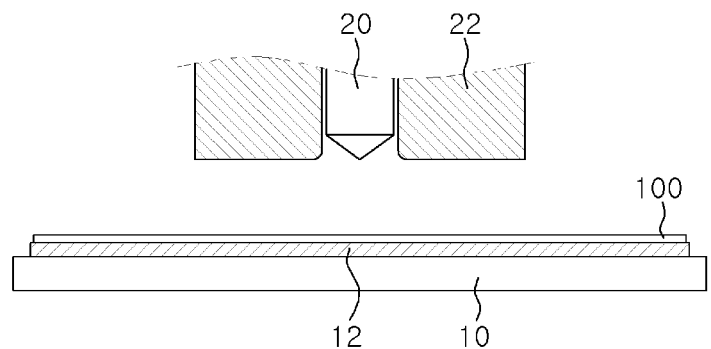

POLYAMIDE-IMIDE FILM, PREPARATION METHOD THEREOF, COVER WINDOW AND DISPLAY DEVICE COMPRISING THE SAME

The present application claims priority of Korean patent application number KR 10-2021-0013651 filed on Jan. 29, 2021 and Korean patent application number 10-2022-0002806 filed on Jan. 7, 2022. The disclosure of each of the foregoing applications is incorporated herein in their entirety.

TECHNICAL FIELD

Embodiments relate to a polyamide-imide film, to a process for preparing the same, and to a cover window and a display device comprising the same.

BACKGROUND ART

Polyamide-imide-based polymers are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyamide-imide is used in various fields. For example, polyamide-imide is made in the form of a powder and used as a coating for a metal or a magnetic wire. It is mixed with other additives depending on the application thereof. In addition, polyamide-imide is used together with a fluoropolymer as a painter for decoration and corrosion prevention. It also plays a role of bonding a fluoropolymer to a metal substrate. In addition, polyamide-imide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide-imide has been developed in the form of a film, which is less expensive and has excellent optical, mechanical, and thermal characteristics. Such a polyamide-imide film may be applied to display materials for organic light-emitting diodes (OLEDs), liquid crystal displays (LCDs), and the like, and to antireflection films, compensation films, and retardation films when phase difference properties are implemented.

When such a polyamide-imide film is applied to a foldable display, a flexible display, and the like, optical properties such as transparency and colorlessness and mechanical properties such as flexibility and hardness are required. In general, however, since optical properties and mechanical properties are in a trade-off relationship, an improvement in the mechanical properties would impair the optical properties.

Accordingly, research on polyamide-imide films with improved mechanical properties and optical properties is continuously required.

DETAILED DESCRIPTION OF THE INVENTION

Technical Problem

An object of the embodiments is to provide a polyamide-imide film that is excellent in optical properties and mechanical properties and a cover window and a display device comprising the same.

Another object of the embodiments is to provide a process for preparing a polyamide-imide film that is excellent in optical properties and mechanical properties.

Solution to the Problem

The polyamide-imide film according to the embodiments comprises a polyamide-imide polymer and has a reduced modulus of a top surface measured by the nanoindentation method according to the ISO 14577-2 standard of 5.6 GPa or more and a haze of 1% or less.

The cover window for a display device according to the embodiments comprises a polyamide-imide film and a functional layer, wherein the polyamide-imide film comprises a polyamide-imide polymer and has a reduced modulus of a top surface measured by the nanoindentation method according to the ISO 14577-2 standard of 5.6 GPa or more.

The display device according to the embodiments comprises a display unit; and a cover window disposed on the display unit, wherein the cover window comprises a polyamide-imide film and a functional layer, and the polyamide-imide film comprises a polyamide-imide polymer and has a reduced modulus of a top surface measured by the nanoindentation method according to the ISO 14577-2 standard of 5.6 GPa or more.

The process for preparing a polyamide-imide film according to the embodiments comprises polymerizing a diamine compound, a dianhydride compound, and a dicarbonyl compound in an organic solvent to prepare a polyamide-imide polymer solution; charging the polymer solution into a tank; extruding and casting the polymer solution in the tank and then drying it to prepare a gel sheet; and thermally treating the gel sheet.

Advantageous Effects of the Invention

In the polyamide-imide film according to the embodiments, the reduced modulus ($E_r$) of a top surface measured by the nanoindentation method according to the ISO 14577-2 standard is adjusted to 5.6 GPa or more, and the haze is adjusted to 1% or less. Thus, it is possible to improve such optical properties as yellow index and transmittance and to enhance such mechanical properties as indentation resistance, restoration capability, and flexibility.

BRIEF DESCRIPTION OF THE DRAWING

FIGS. 1 to 3 are each schematic exploded, perspective, and cross-sectional views of a display device according to an embodiment.

FIG. 4 is a schematic flow diagram of a process for preparing a polyamide-imide film according to an embodiment.

FIG. 5 is a schematic conceptual diagram illustrating a method for measuring the nanoindentation of a polyamide-imide film.

BEST MODE FOR CARRYING OUT THE INVENTION

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expressions related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polyamide-Imide Film

The embodiments provide a polyamide-imide film that is excellent not only in optical properties in terms of high transmittance and low yellow index but also in mechanical properties such as indentation hardness and modulus.

The polyamide-imide film according to an embodiment comprises a polyamide-imide polymer.

The polyamide-imide film has a reduced modulus ($E_r$) of a top surface of 5.6 GPa or more. The reduced modulus of the top surface may be measured by the nanoindentation method.

Specifically, the reduced modulus of the top surface is measured by the nanoindentation method according to the ISO 14577-2 standard. It may also be referred to as an effective modulus. More specifically, the reduced modulus of the top surface may be measured by, for example, pressing with a load of about 10 to 50 mN, maintaining it for about 5 to 60 seconds, and creeping it for about 1 to 20 seconds. It may refer to a modulus in the surface layer defined as a region having a depth of about 0.01 to 10 μm from the surface of the film. In the nanoindentation measurement, for example, a triangular pyramid (Berkovich type) tip may be used.

When the reduced modulus of the top surface is 5.6 GPa or more, the resistance to deformation due to indentation of the film may be increased, and mechanical properties in terms of excellent stability and flexibility may be obtained. In addition, while the mechanical properties are enhanced, such optical properties as transmittance, haze, and yellow index may be maintained at an excellent level. Thus, it can be advantageously applied to a cover window of a flexible device including a foldable device, a rollable device, and the like.

In some embodiments, the reduced modulus of the top surface may be 6 GPa or more, 6.2 GPa or more, 6.3 GPa or more, 6.5 GPa or more, 6.6 GPa or more, 7 GPa or more, 7.1 GPa or more, or 7.3 GPa or more. In addition, the reduced modulus of the top surface may be 15 GPa or less, 12 GPa or less, 10 GPa or less, 9 GPa or less, 8.5 GPa or less, or 8 GPa or less. In such a case, the optical properties and mechanical properties of the film can be enhanced together.

While the polyamide-imide film has a reduced modulus of the top surface as described above, it has a haze of 1% or less. If the haze exceeds 1%, the light transmittance of the film may be decreased and the yellow index may be increased, and the reduced modulus of the top surface may also be decreased. For example, a film having a haze exceeding 1% may be one in which a filler is excessively contained or the degree of crystallinity is excessively increased. Thus, the reduced modulus of the top surface may be decreased to 5.6 GPa or less, and the mechanical properties described above may be deteriorated. Preferably, the haze may be 0.8% or less, 0.7% or less, 0.6% or less, 0.5% or less, or 0.4% or less.

In some embodiments, the polyamide-imide film may have a hardness of the top surface measured by the nanoindentation method of 0.35 GPa or more. The hardness of the top surface may refer to hardness in the surface layer. If the hardness of the top surface is 0.35 GPa or more, the indentation resistance and flexibility of the film may be enhanced, and resistance to scratching may also be enhanced.

In addition, while the above-described mechanical properties are enhanced, such optical properties as yellow index, haze, and transmittance may not be deteriorated. Preferably, the hardness of the top surface may be 0.36 GPa or more, 0.37 GPa or more, 0.38 GPa or more, 0.39 GPa or more, 0.42 GPa or more, 0.43 GPa or more, 0.45 GPa or more, 0.50 GPa or more, or 0.51 GPa or more. In addition, the hardness of the top surface may be 10 GPa or less, 8 GPa or less, 5 GPa or less, 3 GPa or less, 2 GPa or less, 1 GPa or less, or 0.7 GPa or less.

The polyamide-imide film according to an embodiment may have an x-direction refractive index ($n_x$) of 1.60 to 1.70, 1.61 to 1.69, 1.62 to 1.68, 1.64 to 1.68, 1.64 to 1.66, or 1.64 to 1.65.

In addition, the polyamide-imide film may have a y-direction refractive index ($n_y$) of 1.60 to 1.70, 1.61 to 1.69, 1.62 to 1.68, 1.63 to 1.68, 1.63 to 1.66, or 1.63 to 1.64.

Further, the polyamide-imide film may have a z-direction refractive index ($n_z$) of 1.50 to 1.60, 1.51 to 1.59, 1.52 to 1.58, 1.53 to 1.58, 1.54 to 1.58, or 1.54 to 1.56.

If the x-direction refractive index, the y-direction refractive index, and the z-direction refractive index of the polyamide-imide film are within the above ranges, when the film is applied to a display device, its visibility is excellent not only from the front but also from a lateral side, so that a wide angle of view can be achieved.

The polyamide-imide film according to an embodiment may have an in-plane retardation ($R_o$) of 800 nm or less.

Specifically, the in-plane retardation ($R_o$) of the polyamide-imide film may be 700 nm or less, 600 nm or less, 550 nm or less, 100 nm to 800 nm, 200 nm to 800 nm, 200 nm to 700 nm, 300 nm to 700 nm, 300 nm to 600 nm, or 300 nm to 540 nm.

In addition, the polyamide-imide film according to an embodiment may have a thickness direction retardation ($R_{th}$) of 5,000 nm or less. Specifically, the thickness direction retardation ($R_{th}$) of the polyamide-imide film may be 4,800 nm or less, 4,700 nm or less, 4,650 nm or less, 1,000 nm to 5,000 nm, 1,500 nm to 5,000 nm, 2,000 nm to 5,000 nm, 2,500 nm to 5,000 nm, 3,000 nm to 5,000 nm, 3,500 nm to 5,000 nm, 4,000 nm to 5,000 nm, 3,000 nm to 4,800 nm, 3,000 nm to 4,700 nm, 4,000 nm to 4,700 nm, or 4,200 nm to 4,650 nm.

Here, the in-plane retardation ($R_o$) is a parameter defined by a product ($\Delta n_{xy} \times d$) of anisotropy ($\Delta n_{xy} = |n_x - n_y|$) of refractive indices of two mutually perpendicular axes on a film and the film thickness (d), which is a measure of the degree of optical isotropy and anisotropy.

In addition, the thickness direction retardation ($R_{th}$) is a parameter defined by a product of an average of the two birefringences $\Delta n_{xz}(=|n_x - n_z|)$ and $\Delta n_{yz}(=|n_y - n_z|)$ observed on a cross-section in the film thickness direction and the film thickness (d).

If the in-plane retardation and the thickness direction retardation of the polyamide-imide film are within the above ranges, when the film is applied to a display device, it is possible to minimize the optical distortion and color distortion and to minimize the light leakage from a lateral side as well.

The polyamide-imide film may comprise a filler in addition to the polyamide-base polymer. The filler may adjust such mechanical properties as hardness, modulus, brittleness, and flexibility and such optical properties as transmittance, haze, and yellow index of the film.

In some embodiments, an inorganic and/or organic substance having a hardness of 2.5 to 6 may be used as the filler without limitation. If the filler has a hardness within the above range, it is possible to enhance the hardness and modulus of the film, while its flexibility may not be reduced. In addition, the optical properties of the film may not be impaired. Preferably, the hardness of the filler may be 2.5 to 5 or 2.5 to 4.

Preferably, the filler may comprise an inorganic substance such as barium sulfate ($BaSO_4$) and silica, an organic substance such as an acrylate polymer, or a combination thereof.

The filler may have an average particle diameter of 80 nm to 500 nm. Specifically, the average particle diameter of the filler may be 80 nm to 400 nm, 80 nm to 350 nm, 80 nm to 300 nm, 100 nm to 500 nm, 100 nm to 400 nm, 100 nm to 350 nm, 100 nm to 300 nm, 150 nm to 500 nm, 150 nm to 400 nm, 150 nm to 350 nm, 150 nm to 300 nm, 200 nm to 500 nm, 200 nm to 400 nm, 200 nm to 350 nm, 200 nm to 300 nm, but it is not limited thereto. If the filler has a particle diameter within the above range, even when a large amount of the filler is used to achieve excellent mechanical properties, the flexibility of the film may not be deteriorated, or the propagation of light passing through the film may not be disturbed.

The filler may have a refractive index of 1.55 to 1.75. Specifically, the refractive index of the filler may be 1.60 to 1.75, 1.60 to 1.70, 1.60 to 1.68, or 1.62 to 1.65, but it is not limited thereto.

If the refractive index of the filler satisfies the above range, the birefringence values related to $n_x$, $n_y$, and $n_z$ can be appropriately adjusted, and the luminance of the film at various angles can be improved.

On the other hand, if the refractive index of the filler is outside the above range, there may arise a problem that the filler is visually noticeable on the film or that the haze is increased due to the filler.

The content of the filler may be 100 ppm to 3,000 ppm based on the total weight of the solids content of the polyamide-imide polymer. Specifically, the content of the filler may be 100 ppm to 2,500 ppm, 100 ppm to 2,000 ppm, 200 ppm to 3,000 ppm, 200 ppm to 2,500 ppm, 200 ppm to 2,000 ppm, 300 ppm to 3,000 ppm, 300 ppm to 2,500 ppm, or 300 ppm to 2,000 ppm, based on the total weight of the solids content of the polyamide-imide polymer, but it is not limited thereto.

If the content of the filler is outside the above range, the haze of the film is steeply increased, and the filler may aggregate with each other on the surface of the film, so that a feeling of foreign matter may be visually observed, or it may cause a trouble in the sliding performance or deteriorate the windability in the preparation process. In addition, such mechanical properties as hardness and flexibility and such optical properties as transmittance and yellow index of the film may be overall impaired.

The filler may be employed in the form of particles. In addition, the surface of the filler is not subjected to special coating treatment, and it may be uniformly dispersed in the entire film.

Since the polyamide-imide film comprises the filler, the film can secure a wide angle of view without a deterioration in the optical properties.

The content of residual solvents in the polyamide-imide film may be 1,500 ppm or less. For example, the content of residual solvents may be 1,200 ppm or less, 1,000 ppm or less, 800 ppm or less, or 500 ppm or less, but it is not limited thereto.

The residual solvent refers to a solvent that has not been volatilized during the film production and remains in the film finally produced.

If the content of the residual solvents in the polyamide-imide film exceeds the above range, the durability of the film may be deteriorated, and it may have an impact on the luminance.

When the polyamide-imide film according to an embodiment based on a thickness of 50 μm is folded to have a radius of curvature of 3 mm, the number of folding before the fracture may be 200,000 or more.

The number of folding counts one when the film is folded to have a radius of curvature of 3 mm and then unfolded.

As the number of folding of the polyamide-imide film satisfies the above range, it can be advantageously applied to a foldable display device or a flexible display device.

The polyamide-imide film according to an embodiment may have a surface roughness of 0.01 μm to 0.07 μm. Specifically, the surface roughness may be 0.01 μm to 0.07 μm or 0.01 μm to 0.06 μm, but it is not limited thereto.

As the surface roughness of the polyamide-imide film satisfies the above range, it may be advantageous for achieving high luminance even when the angle from the normal direction of a surface light source is increased.

The polyamide-imide film according to an embodiment comprises a polyamide-imide polymer. The polyamide-imide polymer may comprise an amide-based repeat unit and an imide-based repeat unit.

In some embodiments, the polyamide-imide polymer may comprise an imide-based repeat unit and an amide-based repeat unit at a molar ratio of 2:98 to 50:50. In such a case, the flexibility, mechanical strength, and optical properties of the polyamide-imide film may be enhanced together. Preferably, the polyamide-imide polymer may comprise an imide-based repeat unit and an amide-based repeat unit at a molar ratio of 2:98 to 40:60, 2:98 to 30:70, 2:98 to 25:75, 2:98 to 20:80, 3:97 to 50:50, 3:97 to 40:60, 3:97 to 30:70, 3:97 to 25:75, 3:97 to 20:80, or 3:97 to 15:85.

The polyamide-imide polymer may be prepared by simultaneously or sequentially reacting reactants that comprise a diamine compound, a dianhydride compound, and a dicarbonyl compound. Specifically, the polyamide-imide polymer may be prepared by reacting a diamine compound, a dianhydride compound, and a dicarbonyl compound.

Here, the polyamide-imide polymer may comprise an imide repeat unit derived from the polymerization of the diamine compound and the dianhydride compound and an amide repeat unit derived from the polymerization of the diamine compound and the dicarbonyl compound.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

$$H_2N\text{-}(E)_e\text{-}NH_2 \qquad \text{[Formula 1]}$$

In Formula 1,

E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

$(E)_e$ in Formula 1 may be selected from the groups represented by the following Formulae 1-1a to 1-14a, but it is not limited thereto.

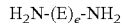
1-1a

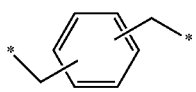
1-2a

1-3a

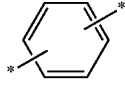
1-4a

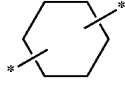

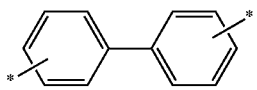
1-5a

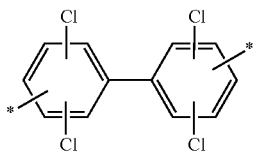
1-6a

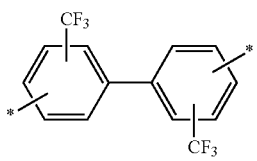
1-7a

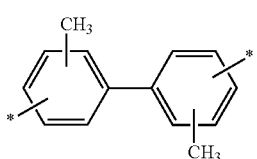
1-8a

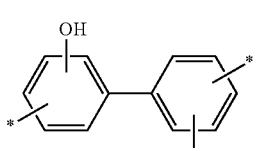
1-9a

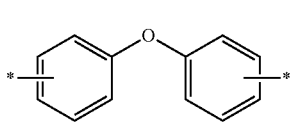
1-10a

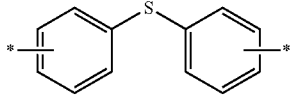
1-11a

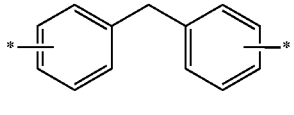
1-12a

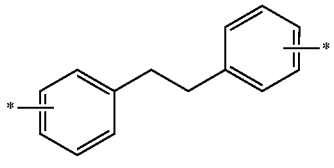
1-13a 1-14a

*—[CH$_2$]$_n$—*

(n is selected from integers of 1 to 12)

Specifically, $(E)_e$ in Formula 1 may be selected from the groups represented by the following Formulae 1-1b to 1-13b, but it is not limited thereto.

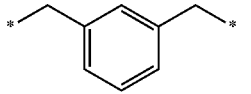
1-1b

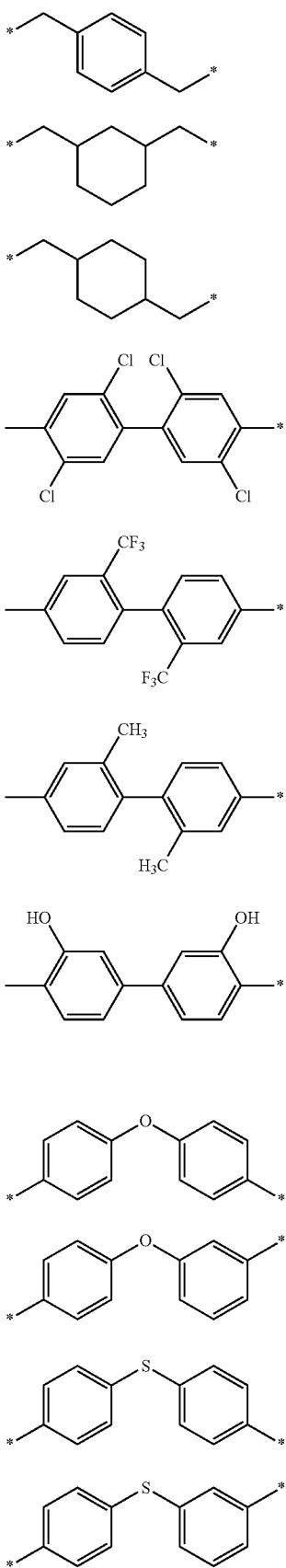

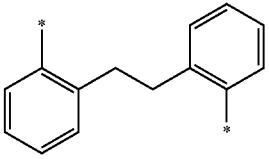

More specifically, $(E)_e$ in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such an event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

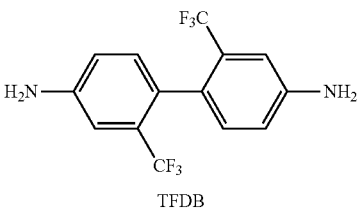

TFDB

The dianhydride compound is not particularly limited, but it may comprise an aromatic dianhydride compound. For example, the dianhydride compound may reduce the birefringence characteristics of the polyamide-imide resin and enhance such optical properties as transmittance of the polyamide-imide film.

In an embodiment, the dianhydride compound may comprise a compound having a fluorine-containing substituent. In such an event, the fluorine-containing substituent may be a fluorinated hydrocarbon group. Specifically, it may comprise a perfluorinated alkyl group such as a trifluoromethyl group (—$C_nF_{4n-1}$, wherein n is a positive integer), but it is not limited thereto.

In some embodiments, the dianhydride compound may comprise two or more aromatic ring groups substituted with a dianhydride group. The aromatic ring groups may be connected to each other by a fluorine-containing substituent. The fluorine-containing substituent may comprise a hydrocarbon group substituted with a fluorinated alkyl group. For example, the fluorinated alkyl group may comprise a perfluorinated alkyl group such as a trifluoromethyl group (—$C_nF_{4n-1}$, wherein n is a positive integer). The hydrocarbon group may comprise a saturated hydrocarbon group, for example, an alkylene group such as a methylene group (—$CH_2$—).

For example, the aromatic dianhydride compound may comprise a compound represented by the following Formula 2.

[Formula 2]

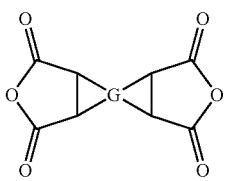

In Formula 2, G is a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone, fused to each other to form a condensed ring, or bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in the above Formula 2 may be selected from the groups represented by the following Formulae 2-1a to 2-9a, but it is not limited thereto.

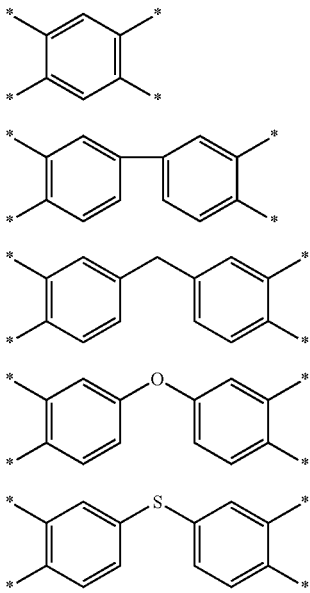

2-1a
2-2a
2-3a
2-4a
2-5a
2-6a
2-7a

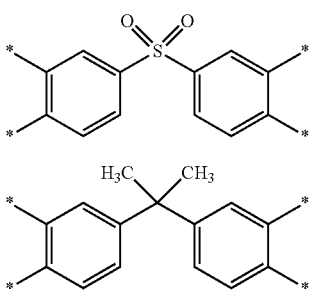

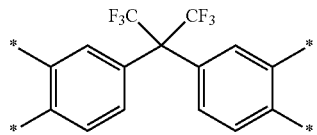

2-8a

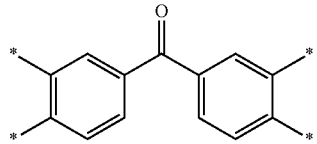

2-9a

For example, G in Formula 2 may be the group represented by the above Formula 2-2a, the group represented by the above Formula 2-8a, or the group represented by the above Formula 2-9a.

For example, the dianhydride compound may comprise 2,2'-bis-(3,4-dicarboxyphenyl)hexafluoropropane dianhydride (6-FDA) represented by the following formula, but it is not limited thereto.

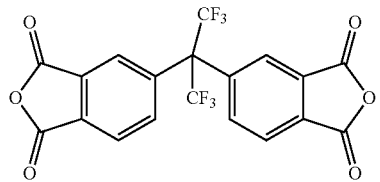

6-FDA

The diamine compound and the dianhydride compound may be polymerized to form an amic acid group.

Subsequently, the amic acid group may be converted to an imide group through a dehydration reaction. In such a case, a polyamide-imide-based polymer comprising a polyimide segment and a polyamide segment may be formed.

The polyimide segment may form a repeat unit represented by the following Formula A.

[Formula 1]

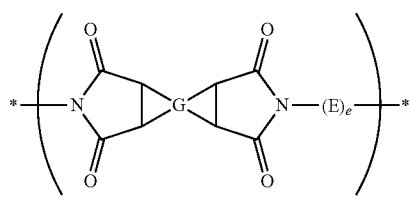

In Formula A, E, G, and e are as described above.

For example, the polyimide segment may comprise a repeat unit represented by the following Formula A-1, but it is not limited thereto.

[Formula A-1]

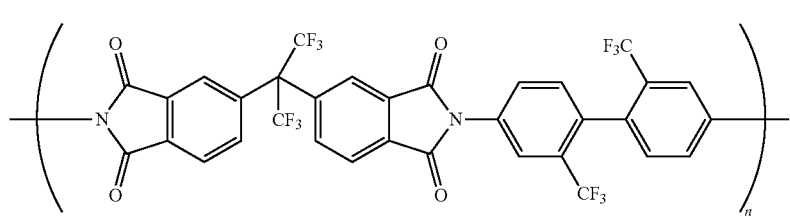

In Formula A-1, n may be an integer of 1 to 400.

The dicarbonyl compound is not particularly limited, but it may be, for example, a compound represented by the following Formula 3.

[Formula 3]

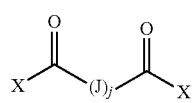

In Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(J)$_j$ in the above Formula 3 may be selected from the groups represented by the following Formulae 3-1a to 3-14a, but it is not limited thereto.

3-1a

3-2a

3-3a

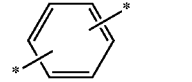

3-4a

3-5a

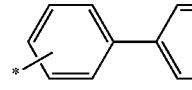

-continued 3-6a

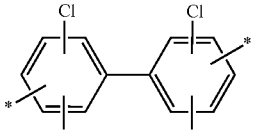

3-7a

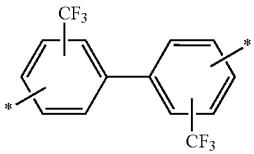

3-8a

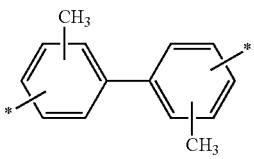

3-9a

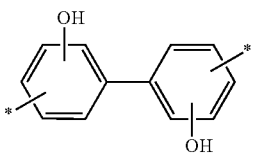

3-10a

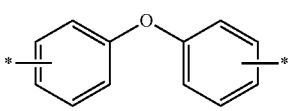

3-11a

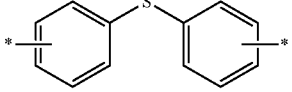

3-12a

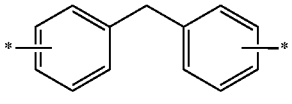

3-13a

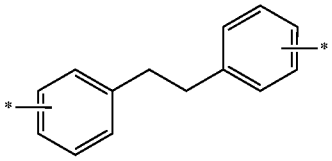

3-14a

(n is selected from integers of 1 to 12)

Specifically, (J)$_j$ in the above Formula 3 may be selected from the groups represented by the following Formulae 3-1b to 3-8b, but it is not limited thereto.

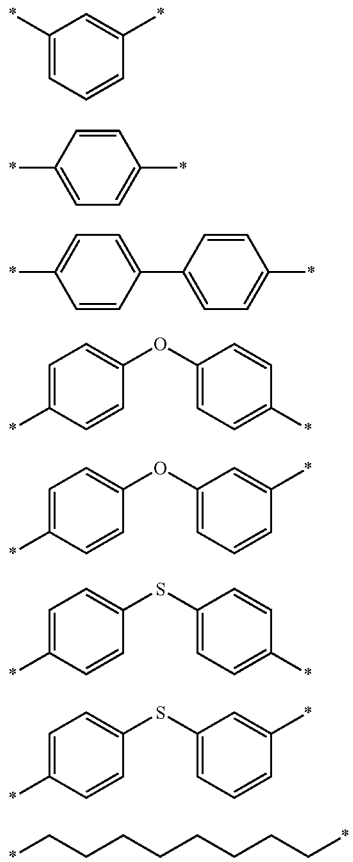

More specifically, (J)$_j$ in Formula 3 may be the group represented by the above Formula 3-1b, the group represented by the above Formula 3-2b, the group represented by the above Formula 3-3b, or the group represented by the above Formula 3-8b.

In an embodiment, a mixture of at least two kinds of dicarbonyl compounds different from each other may be used as the dicarbonyl compound. If two or more dicarbonyl compounds are used, at least two dicarbonyl compounds in which (A in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

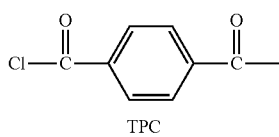

TPC

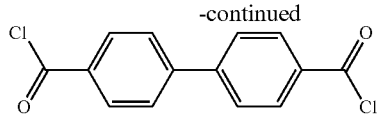

BPDC

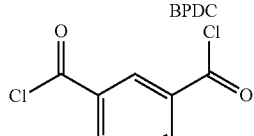

IPC

In an embodiment, the polyamide-imide polymer may comprise two or more types of an amide-based repeat unit.

For example, the two or more types of an amide-based repeat unit may comprise a first amide-based repeat unit and a second amide-based repeat unit. The first amide-based repeat unit may be formed by reacting a first dicarbonyl compound with the diamine compound. The second amide-based repeat unit may be formed by reacting a second dicarbonyl compound with the diamine compound.

The first dicarbonyl compound and the second dicarbonyl compound may be compounds different from each other.

The first dicarbonyl compound and the second dicarbonyl compound may comprise two carbonyl groups, respectively. The angle between the two carbonyl groups contained in the first dicarbonyl compound may be greater than the angle between the two carbonyl groups contained in the second dicarbonyl compound.

In some examples, the first dicarbonyl compound and the second dicarbonyl compound may be structural isomers to each other.

The first dicarbonyl compound and the second dicarbonyl compound may be an aromatic dicarbonyl compound, respectively. In some embodiments, the first dicarbonyl compound and the second dicarbonyl compound may each have one benzene ring (a phenyl group).

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film that comprises the polyamide-imide polymer thus produced.

For example, the angle between the two carbonyl groups contained in the first dicarbonyl compound may be 160 to 180°, and the angle between the two carbonyl groups contained in the second dicarbonyl compound may be 80 to 140°.

For example, the dicarbonyl compound may comprise a first dicarbonyl compound and/or a second dicarbonyl compound.

For example, the first dicarbonyl compound may comprise TPC, and the second dicarbonyl compound may comprise IPC, but they are not limited thereto.

If TPC is used as the first dicarbonyl compound and IPC is used as the second dicarbonyl compound in a proper combination, a film that comprises the polyamide-imide polymer thus produced may have high oxidation resistance, productivity, light transmittance, transparency, and modulus, low haze, and excellent top surface characteristics.

The diamine compound and the dicarbonyl compound may be polymerized to form a repeat unit represented by the following Formula B.

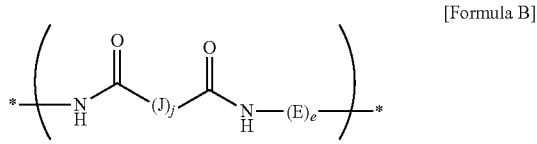

[Formula B]

In Formula B, E, J, e, and j are as described above.

For example, the diamine compound and the dicarbonyl compound may be polymerized to form amide repeat units represented by the following Formulae B-1 and B-2.

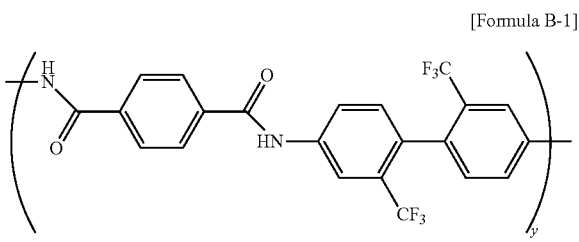

[Formula B-1]

In Formula B-1, y is an integer of 1 to 400.

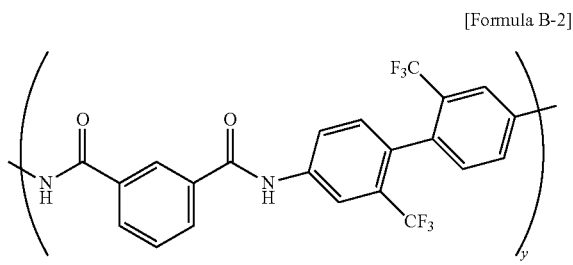

[Formula B-2]

In Formula B-2, y is an integer of 1 to 400.

In some embodiments, the first amide-based repeat unit may be contained in an amount of 25 to 90% by mole based on the total of the dianhydride-based repeat unit, the first amide-based repeat unit, and the second amide-based repeat unit. In addition, for example, it may be contained in an amount of 25 to 85% by mole, 25 to 80% by mole, 25 to 75% by mole, 30 to 90% by mole, 30 to 85% by mole, 30 to 75% by mole, 40 to 90% by mole, 40 to 85% by mole, 40 to 75% by mole, 50 to 90% by mole, 50 to 85% by mole, 50 to 75% by mole, 60 to 90% by mole, 60 to 85% by mole, or 60 to 75% by mole, but it is not limited thereto.

In some embodiments, the molar ratio of the first amide-based repeat unit to the second amide-based repeat unit may be 25:75 to 95:5. Preferably, the molar ratio of the first amide-based repeat unit to the second amide-based repeat unit may be 25:75 to 90:10, 25:75 to 85:15, 25:75 to 80:20, 30:70 to 95:5, 30:70 to 90:10, 30:70 to 85:15, 30:70 to 80:20, 40:60 to 95:5, 40:60 to 90:10, 40:60 to 85:15, 40:60 to 80:20, 50:50 to 95:5, 50:50 to 90:10, 50:50 to 85:15, 50:50 to 80:20, 60:40 to 95:5, 60:40 to 90:10, 60:40 to 85:15, 60:40 to 80:20, 70:30 to 95:5, 70:30 to 90:10, 70:30 to 85:15, or 70:30 to 80:20, but it is not limited thereto.

In some embodiments, the polyamide-imide film has a thickness deviation of 4 μm or less based on a thickness of 50 μm. The thickness deviation may refer to a deviation between the maximum or minimum value with respect to the average of thicknesses measured at 10 random positions of the film. In such a case, as the polyamide-imide film has a uniform thickness, its optical properties and mechanical properties at each point may be uniformly exhibited.

The polyamide-imide film may have a transmittance of 80% or more. For example, the transmittance may be 82% or more, 85% or more, 88% or more, 89% or more, 80% to 99%, 88% to 99%, or 89% to 99%, but it is not limited thereto.

The polyamide-imide film may have a yellow index of 4 or less. For example, the yellow index may be 3.5 or less, or 3 or less, but it is not limited thereto. The polyamide-imide film may have a modulus of 4.5 GPa or more. Specifically, the modulus may be 5.0 GPa or more, 5.5 GPa or more, or 6.0 GPa or more, but it is not limited thereto.

The polyamide-imide film may have a compressive strength of 0.4 kgf/μm or more. Specifically, the compressive strength may be 0.45 kgf/μm or more, or 0.46 kgf/μm or more, but it is not limited thereto.

When the polyamide-imide film is perforated at a speed of 10 mm/min using a 2.5-mm spherical tip in a UTM compression mode, the maximum diameter (mm) of perforation including a crack is 60 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The polyamide-imide film may have a surface hardness of HB or higher. Specifically, the surface hardness may be H or higher, or 2H or higher, but it is not limited thereto.

The polyamide-imide film may have a tensile strength of 15 kgf/mm$^2$ or more. Specifically, the tensile strength may be 18 kgf/mm$^2$ or more, 20 kgf/mm$^2$ or more, 21 kgf/mm$^2$ or more, or 22 kgf/mm$^2$ or more, but it is not limited thereto.

The polyamide-imide film may have an elongation of 15% or more. Specifically, the elongation may be 16% or more, 17% or more, or 17.5% or more, but it is not limited thereto.

The physical properties of the polyamide-imide film as described above are based on a thickness of 40 μm to 60 μm. For example, the physical properties of the polyamide-imide film are based on a thickness of 50 μm.

The features on the components and properties of the polyamide-imide film as described above may be combined with each other.

For example, the polyamide-imide film comprises a polyamide-imide polymer and may have a transmittance of 80% or more and a yellow index of 4 or less.

Cover Window for a Display Device

The cover window for a display device according to an embodiment comprises a polyamide-imide film and a functional layer.

The polyamide-imide film comprises a polyamide-imide polymer and has a reduced modulus of the top surface measured by the nanoindentation method of 5.6 GPa or more.

The details on the polyamide-imide film are as described above.

The cover window for a display device may be advantageously applied to a display device.

As the polyamide-imide film has the nanoindentation and haze characteristics as described above, it may have excellent optical and mechanical properties.

Display Device

The display device according to an embodiment comprises a display unit; and a cover window disposed on the display unit, wherein the cover window comprises a polyamide-imide film and a functional layer.

The polyamide-imide film comprises a polyamide-imide polymer and has a reduced modulus of the top surface measured by the nanoindentation method of 5.6 GPa or more.

The details on the polyamide-imide film and the cover window are as described above.

FIGS. 1 to 3 are each schematic exploded, perspective, and cross-sectional views of a display device according to an embodiment. The cross-sectional view of FIG. 3 may represent a vertical cross-sectional view along the line A-A' of FIG. 2.

Specifically, FIGS. 1 to 3 illustrate a display device, which comprises a display unit (400) and a cover window (300) disposed on the display unit (400), wherein the cover window comprises a polyamide-imide film (100) having a first side (101) and a second side (102) and a functional layer (200), and an adhesive layer (500) is interposed between the display unit (400) and the cover window (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel may display an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the cover window (300). The adhesive layer may be an optically transparent adhesive layer, but it is not particularly limited.

The cover window (300) may be disposed on the display unit (400). The cover window is located at the outermost position of the display device to thereby protect the display unit.

The cover window (300) may comprise a polyamide-imide film and a functional layer. The functional layer may be at least one selected from the group consisting of a hard coating, a reflectance reducing layer, an antifouling layer, and an antiglare layer. The functional layer may be coated on at least one side of the polyamide-imide film.

The polyamide-imide film according to an embodiment can be applied in the form of a film to the outside of a display device without changing the display driving method, the color filter inside the panel, or the laminated structure, thereby providing a display device having a uniform thickness, low haze, high transmittance, and high transparency. Since neither significant process changes nor cost increases are needed, it is advantageous in that the production costs can be reduced.

The polyamide-imide film according to an embodiment is not only excellent in optical characteristics in terms of high transmittance, low haze, and low yellow index, but also enhanced in mechanical properties such as indentation resistance, restoration capability, and flexibility by virtue of an excellent reduced modulus and hardness of the top surface.

In addition, the polyamide-imide film according to an embodiment can minimize the optical distortion since it has at most a certain level of in-plane retardation and thickness direction retardation and can also reduce the light leakage from a lateral side.

As the polyamide-imide film has a reduced modulus and a hardness of the top surface within the above ranges, it has excellent mechanical properties even in the surface layer of the film. Thus, even when it is applied to a large-area display device, it is possible to achieve excellent indentation resistance and flexibility over the entire area, thereby enhancing the durability of the device. In addition, when it is applied to foldable/rollable/flexible display devices, it is possible to effectively suppress the plastic deformation mainly occurring in the surface layer of the exposed surface of the device.

Process for Preparing a Polyamide-Imide Film

An embodiment provides a process for preparing a polyamide-imide film.

In addition, the nanoindentation characteristics and haze of the polyamide-imide film as described above may be the results materialized by combinations of the chemical and physical properties of the components, which constitute the polyamide-imide film, along with the conditions in each step of the process for preparing the polyamide-imide film as described below.

For example, the composition and content of the components that constitute the polyamide-imide film, the polymerization conditions and thermal treatment conditions in the film preparation process, and the like are all combined to achieve the desired nanoindentation characteristics.

The process for preparing a polyamide-imide film according to an embodiment comprises polymerizing a diamine compound, a dianhydride compound, and a dicarbonyl compound to prepare a polyamide-imide polymer solution; charging the polymer solution into a tank; extruding and casting the polymer solution and then drying it to prepare a gel sheet; and thermally treating the gel sheet.

Referring to FIG. 4, the process for preparing a polyamide-imide film according to an embodiment comprises polymerizing a diamine compound, a dianhydride compound, and a dicarbonyl compound to prepare a polyamide-imide polymer solution (S100); charging the polymer solution into a tank (S110); extruding and casting the polymer solution and then drying it to prepare a gel sheet (S200); and thermally treating the gel sheet (S300).

The polyamide-imide film is a film that comprises a polyamide-imide polymer. The polyamide-imide polymer is a resin that comprises, as a structural unit, an amide repeat unit and an imide repeat unit.

In the process for preparing a polyamide-imide film, a polymer solution for preparing the polyamide-imide polymer may be prepared by simultaneously or sequentially mixing a diamine compound, a dianhydride compound, and a dicarbonyl compound in an organic solvent in a reactor, and reacting the mixture (S100).

In an embodiment, the polymer solution may be prepared by simultaneously mixing and reacting a diamine compound, a dianhydride compound, and a dicarbonyl compound in an organic solvent.

In an embodiment, a diamine compound and a dianhydride compound may be reacted first in an organic solvent, which may be then reacted with a dicarbonyl compound. For example, a dianhydride compound is reacted with a diamine compound to form a polyamic acid or a polyimide. Then, the polyamic acid or polyimide may be reacted with a dicarbonyl compound to form a polymer solution comprising a polyamide-imide.

In some embodiments, the dianhydride compound to the dicarbonyl compound may be employed at a molar ratio of 2:98 to 50:50. The molar ratio may be 2:98 to 40:60, 2:98 to 30:70, 2:98 to 25:75, 2:98 to 20:80, 3:97 to 50:50, 3:97 to 40:60, 3:97 to 30:70, 3:97 to 25:75, 3:97 to 20:80, or 3:97 to 15:85.

In an embodiment, two different kinds of dicarbonyl compound may be used as the dicarbonyl compound. In such a case, the two kinds of dicarbonyl compounds may be mixed and reacted simultaneously or sequentially. Preferably, the first dicarbonyl compound may be reacted with the diamine compound, polyamic acid, or polyimide to form a prepolymer, and the prepolymer may be reacted with the second dicarbonyl compound to form the polyamide-imide polymer. In such a case, the nanoindentation characteristics of the polyamide-imide polymer may be readily adjusted.

The polymer contained in the polymer solution comprises an amide repeat unit derived from the polymerization of the diamine compound and the dicarbonyl compound and an imide repeat unit derived from the polymerization of the diamine compound and the dianhydride compound.

In an embodiment, the mixing and reaction of the diamine compound and the dianhydride compound may be carried out at a temperature of 0 to 50° C. If it is outside the above temperature range, excessively few or many polymerization nuclei are formed, thereby making it difficult to form a polyamide-imide polymer having the desired plastic and elastic characteristics. Thus, the mechanical properties and optical properties of the polyamide-imide film may be deteriorated. In addition, the viscosity of the polymer solution may be less than a predetermined range. Preferably, the mixing and reaction of the diamine compound and the dianhydride compound may be carried out at a temperature of 0 to 45° C., 0 to 40° C., 10 to 50° C., 10 to 45° C., 10 to 40° C., 20 to 50° C., 20 to 45° C., or 20 to 40° C.

In an embodiment, the mixing and reaction of the diamine compound, polyamic acid, or polyimide with the dicarbonyl compound may be carried out at a temperature of −20 to 25° C. For example, the mixing and reaction of the solvent, the diamine compound, and the dicarbonyl compound may be carried out at a temperature of −20 to 25° C. If it is outside the above temperature range, excessively few or many polymerization nuclei are formed, thereby making it difficult to form a polyamide-imide polymer having desired properties. As a result, the top surface characteristics as described above may not be achieved. Thus, such properties as modulus and yellow index of the polyamide-imide film may be deteriorated. In addition, the viscosity of the polymer solution may be less than a predetermined range, thereby increasing the thickness deviation of a film formed therefrom. Preferably, the step of preparing the solution comprising a polyamide-imide polymer may be carried out at a temperature of −20 to 20° C., −20 to 15° C., −20 to 10° C., −15 to 20° C., −15 to 15° C., −15 to 10° C., −10 to 20° C., −10 to 15° C., −10 to 10° C., −8 to 20° C., −8 to 15° C., −8 to 10° C., −5 to 20° C., −5 to 15° C., or −5 to 10° C.

The content of solids contained in the polymer solution may be 10% by weight to 30% by weight, but it is not limited thereto.

If the content of solids contained in the polymer solution is within the above range, a polyamide-imide film can be effectively produced in the casting step. In addition, the polyamide-imide film thus produced may have mechanical properties in terms of an enhanced modulus (e.g., reduced modulus of the top surface) and the like and optical properties in terms of a low yellow index and the like.

In still another embodiment, the step of preparing the polymer solution may further comprise adjusting the pH of the polymer solution. In this step, the pH of the polymer solution may be adjusted to 4 to 7, for example, 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

As the pH of the polymer solution is adjusted to the above range, it is possible to prevent the occurrence of defects in the film produced from the polymer solution and to achieve the desired optical properties and mechanical properties in terms of yellow index and modulus.

The pH adjusting agent may be employed in an amount of 0.1% by mole to 10% by mole based on the total number of moles of monomers in the polymer solution.

The molar ratio of the first dicarbonyl compound to the second dicarbonyl compound used to prepare the polymer solution may be 25:75 to 95:5. Preferably, the molar ratio of the first dicarbonyl compound to the second dicarbonyl compound may be 25:75 to 90:10, 25:75 to 85:15, 25:75 to 80:20, 30:70 to 95:5, 30:70 to 90:10, 30:70 to 85:15, 30:70 to 80:20, 40:60 to 95:5, 40:60 to 90:10, 40:60 to 85:15, 40:60 to 80:20, 50:50 to 95:5, 50:50 to 90:10, 50:50 to 85:15, 50:50 to 80:20, 60:40 to 95:5, 60:40 to 90:10, 60:40 to 85:15, 60:40 to 80:20, 70:30 to 95:5, 70:30 to 90:10, 70:30 to 85:15, or 70:30 to 80:20, but it is not limited thereto.

As the first dicarbonyl compound and the second dicarbonyl compound are used at such a ratio, it is possible to prepare a polyamide-imide polymer having nanoindentation and haze characteristics within the above ranges and to improve the mechanical properties and optical properties of the polyamide-imide film.

In some embodiments, the step of preparing the polyamide-imide polymer solution may comprise polymerizing the diamine compound, the dianhydride compound, and the dicarbonyl compound to produce a first polymer solution; and further reacting the first polymer solution with the dicarbonyl compound to produce a second polymer solution that has an increased viscosity. In such an event, the viscosity of the second polymer solution may be 100,000 cps to 500,000 cps at room temperature. In such an event, the film-forming capability of a polyamide-imide film can be enhanced, thereby enhancing the thickness uniformity and optical/mechanical properties. Preferably, the viscosity of the second polymer solution may be 100,000 cps to 400,000 cps, 100,000 cps to 350,000 cps, 150,000 cps to 500,000 cps, 150,000 cps to 400,000 cps, 150,000 cps to 350,000 cps, 200,000 cps to 500,000 cps, 200,000 cps to 400,000 cps, or 200,000 cps to 350,000 cps at room temperature, but it is not limited thereto.

In some embodiment, in the steps of preparing the first polymer solution and the second polymer solution, the stirring speeds may be different from each other. For example, the stirring speed when the first polymer solution is prepared may be faster than the stirring speed when the second polymer solution is prepared.

In some embodiment, when the first polymer solution is prepared, the first dicarbonyl compound and the second dicarbonyl compound may be sequentially reacted with the diamine compound and the dianhydride compound. In such an event, a first polymer solution having a viscosity of less than 100,000 cPs may be formed. For example, the viscosity of the first polymer solution may be greater than 10,000 cps to less than 100,000 cps.

In some embodiments, the second dicarbonyl compound may be further reacted with the first polymer solution to form a second polymer solution. For example, the viscosity of the first polymer solution may be adjusted within the above range by the second dicarbonyl compound.

The amount of the second dicarbonyl compound used to form the second polymer solution may be 0.1 to 10% by weight of the amount used to form the first polymer solution. Preferably, the second dicarbonyl compound may be used in the formation of the second polymer solution in an amount of 0.1 to 5% by weight, 0.1 to 3% by weight, 0.5 to 10% by weight, 0.5 to 5% by weight, 0.5 to 3% by weight, 1 to 10% by weight, 1 to 5% by weight, or 1 to 3% by weight, relative to the amount used in the formation of the first polymer solution.

Details on the diamine compound and the dicarbonyl compound are as described above.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

The polymer solution may be charged to, and stored in, a tank (S110).

The polymer solution may be stored at −20° C. to 20° C., −20° C. to 10° C., −20° C. to 5° C., −20° C. to 0° C., or 0° C. to 10° C.

If it is stored at the above temperature, it is possible to prevent degradation of the polymer solution and to lower the moisture content to thereby prevent defects of a film produced therefrom.

In an embodiment, the process may further comprise degassing the polyamide-imide polymer solution (S130). The step of degassing may remove moisture in the polymer solution and reduce impurities, thereby increasing the reaction yield and imparting excellent surface appearance and mechanical properties to the film finally produced.

The degassing may comprise vacuum degassing or purging with an inert gas.

The vacuum degassing may be carried out for 30 minutes to 3 hours after depressurizing the internal pressure of the tank in which the polymer solution is contained to 0.1 bar to 0.7 bar. The vacuum degassing under these conditions may reduce bubbles in the polymer solution. As a result, it is possible to prevent surface defects of the film produced therefrom and to achieve excellent optical properties such as haze.

Specifically, the purging may be carried out by purging the tank with an inert gas at an internal pressure of 1 atm to 2 atm. The purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The vacuum degassing and the purging with an inert gas may be carried out in separate steps.

For example, the step of vacuum degassing may be carried out, followed by the step of purging with an inert gas, but it is not limited thereto.

The vacuum degassing and/or the purging with an inert gas may improve the physical properties of the surface of a polyamide-imide film thus produced.

In some embodiments, the polymer solution may be aged (S120).

The aging may be carried out by leaving the polymer solution at a temperature of −10 to 10° C. for 24 hours or longer. In such an event, the polyamide-imide polymer or unreacted materials contained in the polymer solution, for example, may complete the reaction or achieve chemical equilibrium, whereby the polymer solution may be homogenized. The mechanical properties and optical properties of a polyamide-imide film formed therefrom may be substantially uniform over the entire area and entire depth of the film. Preferably, the aging may be carried out at a temperature of −5 to 10° C., −5 to 5° C., or −3 to 5° C.

Once the polyamide-imide polymer solution in an organic solvent has been prepared as described above, a filler may be added to the polymer solution. For example, the addition of the filler may be carried out before the aging, before the defoaming, before the purging, or before the storage (charging to a tank).

The filler may be dispersed in a dispersion solvent and added as a filler dispersion. A solvent exemplified above as a solvent for the polymer formation reaction may be used as a dispersion solvent of the filler dispersion. Preferably, the dispersion solvent and the polymer reaction solvent may be the same.

In some embodiments, the content of filler solids contained in the filer dispersion may be 10 to 30% by weight. In such an event, the filler may be mixed homogeneously in the polymer solution. As a result, the indentation characteristics of the surface layer of the film may be enhanced, and the film may be uniform as a whole and have enhanced optical properties.

Details on the filler are as described above.

The polymer solution may be cast to prepare a gel sheet (S200).

For example, the polymer solution may be extruded, coated, and/or dried on a support to form a gel sheet.

In addition, the casting thickness of the polymer solution may be 200 μm to 700 μm. As the polymer solution is cast to a thickness within the above range, the final film produced after the drying and thermal treatment may have an appropriate and uniform thickness.

The polymer solution may have a viscosity of 200,000 cps to 350,000 cps at room temperature as described above. As the viscosity satisfies the above range, the polymer solution can be cast to a uniform thickness without defects, and a polyamide-imide film having a substantially uniform thickness can be formed without local/partial variations in the optical/mechanical properties in the thickness and plane directions during drying.

The polymer solution is cast and then dried at a temperature of 60° C. to 150° C. for 5 minutes to 60 minutes to prepare a gel sheet. Specifically, the polymer solution is dried at a temperature of 70° C. to 90° C. for 15 minutes to 40 minutes to prepare a gel sheet.

The solvent of the polymer solution may be partially or totally volatilized during the drying to prepare the gel sheet.

The dried gel sheet may be thermally treated to form a polyamide-imide film (S300).

The thermal treatment of the gel sheet may be carried out, for example, through a thermosetting device.

The thermosetting device may thermally treat the gel sheet through hot air.

If the thermal treatment is carried out with hot air, the heat may be uniformly supplied. If the heat is not uniformly supplied, a satisfactory surface roughness cannot be achieved, which may raise or lower the surface energy too much.

The thermal treatment of the gel sheet may be carried out in a temperature range of 60° C. to 500° C. for 5 minutes to 200 minutes. Specifically, the thermal treatment of the gel sheet may be carried out in a temperature range of 80° C. to 300° C. at a temperature elevation rate of 1.5° C./minute to 20° C./minute for 10 minutes to 150 minutes.

In such an event, the initial temperature of the thermal treatment of the gel sheet may be 60° C. or higher. Specifically, the initial temperature of the thermal treatment of the gel sheet may be 80° C. to 180° C.

In addition, the maximum temperature in the thermal treatment may be 300° C. to 500° C. For example, the maximum temperature in the thermal treatment may be 350° C. to 500° C., 380° C. to 500° C., 400° C. to 500° C., 410° C. to 480° C., 410° C. to 470° C., or 410° C. to 450° C.

According to an embodiment, the thermal treatment of the gel sheet may be carried out in two or more steps.

Specifically, the thermal treatment may comprise a first hot air treatment step carried out for 5 minutes to 30 minutes in a range of 60° C. to 120° C.; and a second hot air treatment step carried out for 10 minutes to 120 minutes in a range of 120° C. to 350° C.

The thermal treatment under these conditions may render the gel sheet have a desired reduced modulus and/or hardness of the top surface and may secure high light transmittance, low haze, and an appropriate level of glossiness of the cured film at the same time.

According to an embodiment, the thermal treatment may comprise passing it through an IR heater. The thermal treatment by an IR heater may be carried out for 1 minute to 30 minutes in a temperature range of 300° C. or higher. Specifically, the thermal treatment by an IR heater may be carried out for 1 minute to 20 minutes in a temperature range of 300° C. to 500° C.

The polyamide-imide film is prepared by the preparation process as described above such that it may have a high reduced modulus and/or hardness of the top surface along with a low haze, so that its optical and mechanical properties can be enhanced together.

The polyamide-imide film may be applicable to various uses that require flexibility, transparency, and a certain level of luminance. For example, the polyamide-imide film may be applied to solar cells, displays, semiconductor devices, sensors, and the like.

In particular, since the polyamide-imide film has excellent surface characteristics and optical properties, it can be advantageously applied to a cover window for a display device and to a display device. Since it has excellent folding characteristics, it can be advantageously applied to a foldable display device or a flexible display device.

Details on the polyamide-imide film prepared by the process for preparing a polyamide-imide film are as described above.

EMBODIMENTS FOR CARRYING OUT THE INVENTION

Hereinafter, the present invention will be described in more detail with reference to the following examples. However, these examples are set forth to illustrate the present invention, and the scope of the present invention is not limited thereto.

EXAMPLE

Example 1

A 1-liter glass reactor equipped with a temperature-controllable double jacket was charged with dimethylacetamide (DMAc) as an organic solvent at 20° C. under a nitrogen atmosphere. Then, 0.2 mole of 2,2'-bis(trifluoromethyl)-4,4'-diaminobiphenyl (TFMB) was slowly added thereto for dissolution thereof. Thereafter, 2,2'-bis(3,4-dicarboxyphenyl)hexafluoropropane dianhydride (6-FDA) was slowly added thereto, followed by stirring for 1 hour. Subsequently, isophthaloyl chloride (IPC) was added, followed by stirring for 1 hour. And terephthaloyl chloride (TPC) was added, followed by stirring for 1 hour, thereby preparing a polymer solution.

Subsequently, a barium sulfate dispersion (solids content: 18.2% by weight and organic solvent: DMAc) was added to the polymer solution and stirred.

The polymer solution thus obtained was coated onto a glass plate and then dried with hot air at 80° C. for 30 minutes. It was detached from the glass plate, fixed to a pin frame while it has been stretched by about 5% in the TD direction, and thermally treated in a temperature range of 80° C. to 300° C. at a temperature elevation rate of 2° C./minute to obtain a polyamide-imide film having a thickness of 50 μm.

As to the contents of the diamine compound (TFMB), dianhydride compound (6-FDA), and the dicarbonyl compounds (TPC and IPC), the molar ratios thereof are shown in Table 1. The number of moles of the dianhydride compound and the dicarbonyl compounds is based on 100 moles of the diamine compound.

Examples 2 to 8 and Comparative Examples 1 and 2

Films were prepared in the same manner as in Example 1, except that the contents of the respective reactants, the type, content, and hardness of the filler, and the like were changed as shown in Table 1 below. The content of the filler shown in Table 1 below was based on the total weight of the solids content of the polymer.

Evaluation Example

The films prepared in Examples 1 to 8 and Comparative Examples 1 and 2 were each measured and evaluated for the following properties. The results are shown in Table 1 below.

Evaluation Example 1: Measurement of Film Thickness

The thickness was measured at 10 points in the transverse direction using a digital micrometer 547-401 manufactured by Mitutoyo Corporation. Their average value was adopted as the thickness.

Evaluation Example 2: Measurement of Average Particle Size and Hardness of Fillers The average particle diameter ($D_{50}$) of the filler was measured using a Mastersizer 3000 of Malvern Panalytical in the UK.

The hardness of the filler was measured as Mohs hardness.

Evaluation Example 3: Reduced Modulus and Hardness of the Top Surface

FIG. 5 is a schematic conceptual diagram illustrating a method for measuring the nanoindentation of a polyamide-imide film.

The hardness (indentation hardness; HIT) of the top surface and the reduced modulus ($E_r$) of the top surface of the side of the film that was in contact with a glass plate were measured by the nanoindentation method shown in FIG. 5.

Specifically, a plate support (12) (3T thickness GLASS TEST PLATE (Fischerscope Part no. 600-028)) was placed in the measuring area on a measuring table (10). Thereafter, the support (12) was covered with a film (100) and a portion of the film positioned on the support (12) was measured according to the following conditions using an indenter (20) supported by an indenter holder (22).

Nanoindenter apparatus: FISCHERSCOPE HM2000
Measurement standard: ISO 14577-2
Measurement conditions: 30 mN of pressure load, hold for 20 seconds, creep for 5 seconds
Tip shape: triangular pyramid (Berkovich)
Tip material: diamond

Evaluation Example 4: Measurement of Transmittance and Haze

The light transmittance and haze were measured using a haze meter NDH-5000W manufactured by Nippon Denshoku Kogyo in accordance with the JIS K 7136 standard.

Evaluation Example 5: Measurement of Yellow Index

The yellow index (YI) was measured with a spectrophotometer (UltraScan PRO, Hunter Associates Laboratory) under the conditions of d65 and 10° in accordance with the ASTM-E313 standard.

TABLE 1

|  |  | Ex. 1 | Ex. 2 | Ex. 3 | Ex. 4 | Ex. 5 | Ex. 6 | Ex. 7 | Ex. 8 | C. Ex. 1 | C. Ex. 2 |
|---|---|---|---|---|---|---|---|---|---|---|---|
| Composition | Diamine | TFMB 100 | TFMB 100 | TFMB 100 | TFMB 100 | TFMB 100 | TFMB 100 | TFMB 100 | TFMB 100 | TFMB 100 | TFMB 100 |
|  | Dianhydride | 6FDA 3 | 6FDA 7 | 6FDA 9 | 6FDA 15 | 6FDA 15 | 6FDA 15 | 6FDA 15 | 6FDA 15 | 6FDA 15 | 6FDA 15 |
|  | Dicarbonyl compound | IPC 22 TPC 75 | IPC 18 TPC 75 | IPC 16 TPC 75 | IPC 10 TPC 75 | IPC 10 TPC 75 | IPC 10 TPC 75 | IPC 10 TPC 75 | IPC 10 TPC 75 | IPC 10 TPC 75 | IPC 10 TPC 75 |
|  | Imide:amide | 3:97 | 7:93 | 9:91 | 15:85 | 15:85 | 15:85 | 15:85 | 15:85 | 15:85 | 15:85 |
| Filler type |  | $BaSO_4$ | $BaSO_4$ | $BaSO_4$ | $BaSO_4$ | $BaSO_4$ | $BaSO_4$ | $BaSO_4$ | $BaSO_4$ | Silica | Silica |
| Filler content (ppm) |  | 1,000 | 1,000 | 1,000 | 1,000 | 200 | 500 | 1,500 | 2,000 | 1,000 | 200 |
| Filler avg. particle diameter (nm) |  | 100 | 100 | 100 | 100 | 100 | 100 | 100 | 100 | 100 | 100 |
| Filler hardness |  | 3.2 | 3.2 | 3.2 | 3.2 | 3.2 | 3.2 | 3.2 | 3.2 | 7 | 7 |
| Film thickness | μm | 50 | 50 | 50 | 50 | 50 | 50 | 50 | 50 | 50 | 50 |
| Hardness of the top surface | GPa | 0.571 | 0.568 | 0.501 | 0.428 | 0.367 | 0.388 | 0.597 | 0.688 | 0.505 | 0.375 |
| Reduced modulus of the top surface | GPa | 7.424 | 7.115 | 6.771 | 6.225 | 6.257 | 6.587 | 7.333 | 7.965 | 6.7 | 5.521 |
| Transmittance | % | 89.1 | 89.1 | 89.1 | 88.9 | 89.4 | 89.3 | 88.7 | 88.6 | 89 | 88.9 |
| Haze | % | 0.4 | 0.4 | 0.4 | 0.5 | 0.2 | 0.2 | 0.6 | 0.7 | 3.1 | 0.4 |
| Yellow index | — | 2.9 | 2.9 | 2.9 | 2.5 | 2.2 | 2.4 | 2.6 | 2.7 | 2.7 | 2.4 |

As can be seen from Table 1 above, in the polyamide-imide films of Examples 1 to 8, the reduced modulus of the top surface measured by the nanoindentation method satisfied 5.6 GPa or more, so that the hardness and stiffness of the film surface were excellent, resulting in excellent restoration capability in the elastic region.

In addition, in the polyamide-imide films of the Examples, the hardness of the top surface measured by the nanoindentation method satisfied 0.35 GPa or more, so that the indentation resistance and impact resistance were excellent.

The polyamide-imide films according to the embodiment had excellent mechanical properties of the top surface as described above, as well as excellent optical properties such as transmittance, haze, and yellow index. Thus, it can be advantageously applied to a display front panel and a display device. In particular, it can be advantageously applied to a foldable display device or a flexible display device.

In contrast, in the film according to Comparative Example 1 in which a large amount of a filler having a relatively high hardness was employed, the haze was steeply increased. In the film according to Comparative Example 2 in which the amount of a filler employed was small, while a filler having a relatively high hardness was employed, the reduced modulus of the top surface was relatively low, resulting in deterioration in elasticity. Thus, they were inappropriate for application to a display device.

EXPLANATION OF REFERENCE NUMERALS

| | |
|---|---|
| 10: measuring table | 12: support |
| 20: indenter | 22: indenter holder |
| 100: polyamide-imide film | |
| 101: first side | 102: second side |
| 200: functional layer | 300: cover window |
| 400: display unit | 500: adhesive layer |

The invention claimed is:

1. A polyamide-imide film, which comprises a polyamide-imide polymer and has a reduced modulus of a top surface measured by the nanoindentation method according to the ISO 14577-2 standard of 6.0 GPa or more, a hardness of the top surface measured by the nanoindentation method according to the ISO 14577-2 standard of 0.35 GPa or more, and a haze of 1% or less, and wherein the polyamide-imide film further comprises a filler, and the filler has a hardness of 2.5 to 6.

2. The polyamide-imide film of claim 1, wherein the average particle diameter of the filler is 80 nm to 500 nm.

3. The polyamide-imide film of claim 1, wherein the content of the filler is 100 ppm to 3,000 ppm based on the total weight of the solids content of the polyamide-imide polymer.

4. The polyamide-imide film of claim 1, wherein the filler is at least one selected from the group consisting of barium sulfate, silica, and an acrylate polymer.

5. The polyamide-imide film of claim 1, wherein the polyamide-imide polymer comprises an imide-based repeat unit and an amide-based repeat unit at a molar ratio of 2:98 to 50:50.

6. A cover window for a display device, which comprises a polyamide-imide film and a functional layer,
wherein the polyamide-imide film comprises a polyamide-imide polymer and has a reduced modulus of a top surface measured by the nanoindentation method according to the ISO 14577-2 standard of 6.0 GPa or more, a hardness of the top surface measured by the nanoindentation method according to the ISO 14577-2 standard of 0.35 GPa or more, and a haze of 1% or less, and wherein the polyamide-imide film further comprises a filler, and the filler has a hardness of 2.5 to 6.

7. A display device, which comprises a display unit; and a cover window disposed on the display unit,
wherein the cover window comprises a polyamide-imide film and a functional layer, and
the polyamide-imide film comprises a polyamide-imide polymer and has a reduced modulus of a top surface measured by the nanoindentation method according to the ISO 14577-2 standard of 6.0 GPa or more, a hardness of the top surface measured by the nanoindentation method according to the ISO 14577-2 standard of 0.35 GPa or more, and a haze of 1% or less, and wherein the polyamide-imide film further comprises a filler, and the filler has a hardness of 2.5 to 6.

8. A process for preparing the polyamide-imide film according to claim 1, which comprises:
polymerizing a diamine compound, a dianhydride compound, and a dicarbonyl compound in an organic solvent to prepare a polyamide-imide polymer solution;
charging the polymer solution into a tank;
extruding and casting the polymer solution in the tank and then drying it to prepare a gel sheet; and
thermally treating the gel sheet,
wherein the polymerizing step is carried out at a temperature of −20 to 15° C., and
wherein a step of adding a filler dispersion in which the filler is dispersed to the solution is carried out after the polymerizing step.

9. The process for preparing the polyamide-imide film of claim 8, wherein the solids content of the filler contained in the filer dispersion is 10% by weight to 30% by weight.

* * * * *